March 24, 1931. V. G. SOUDER 1,797,801
WINDSHIELD MOUNTING
Filed Nov. 2, 1927 2 Sheets-Sheet 1

INVENTOR.
Vernon G. Souder
BY Edward N. Pageleen
ATTORNEY.

March 24, 1931.  V. G. SOUDER  1,797,801
WINDSHIELD MOUNTING
Filed Nov. 2, 1927  2 Sheets-Sheet 2
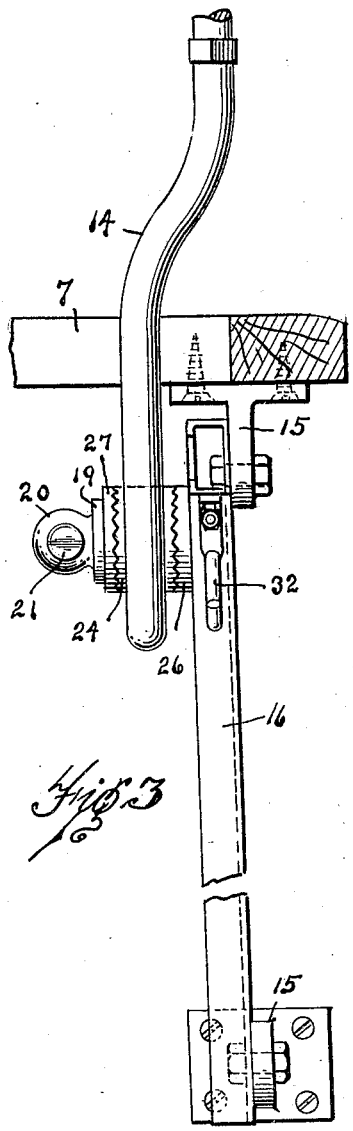
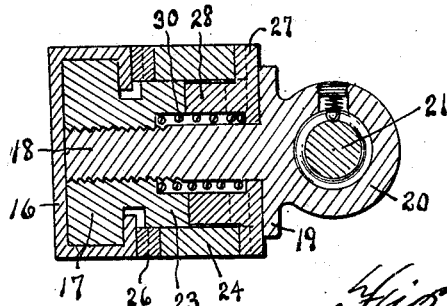
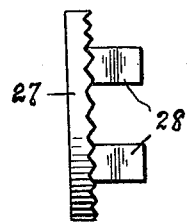
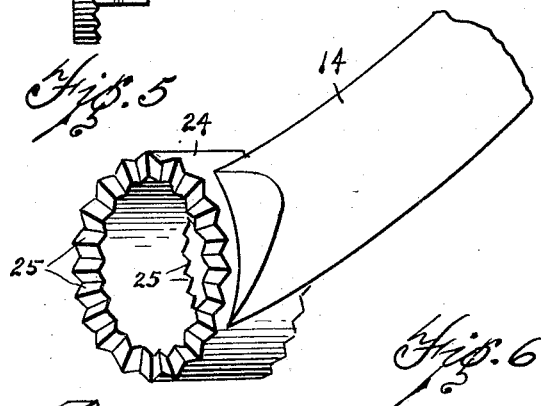
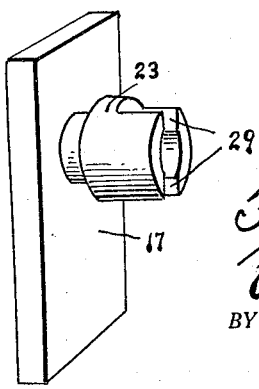
INVENTOR.
Vernon G. Souder
BY Edward N. Pagelsen
ATTORNEY.

Patented Mar. 24, 1931

1,797,801

UNITED STATES PATENT OFFICE

VERNON G. SOUDER, OF DETROIT, MICHIGAN, ASSIGNOR TO AMERICAN INJECTOR COMPANY, OF DETROIT, MICHIGAN, A CORPORATION OF MICHIGAN

WINDSHIELD MOUNTING

Application filed November 2, 1927. Serial No. 230,461.

This invention relates to the supports for windshields adapted to be mounted in front of the rumble seats of automobiles, and its object is to provide adjustable supports for such windshield which will permit them to be positioned within the bodies of the vehicles.

This invention consists in a pair of guide bars and slidable connections between the lower ends of the legs of a windshield frame and such guide bars which will permit the windshield to be moved into position above the body of the automobile or be moved into said body, as may be desired. It further consists in the details of construction illustrated in the accompanying drawings and particularly pointed out in the claims.

Figure 1:
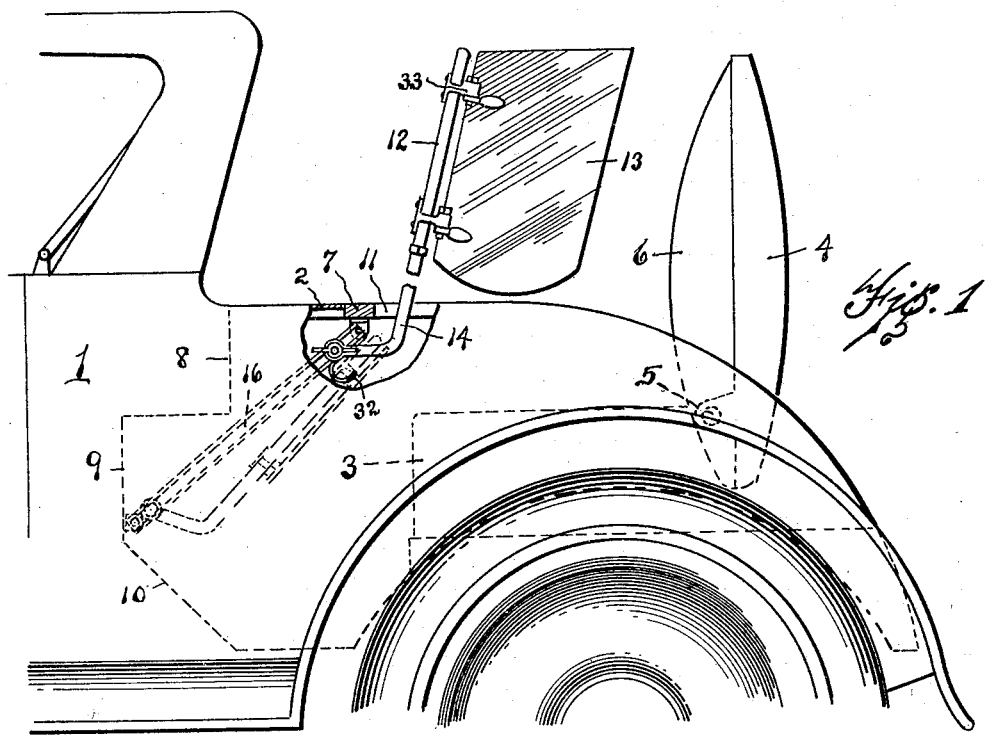
Figure 2:
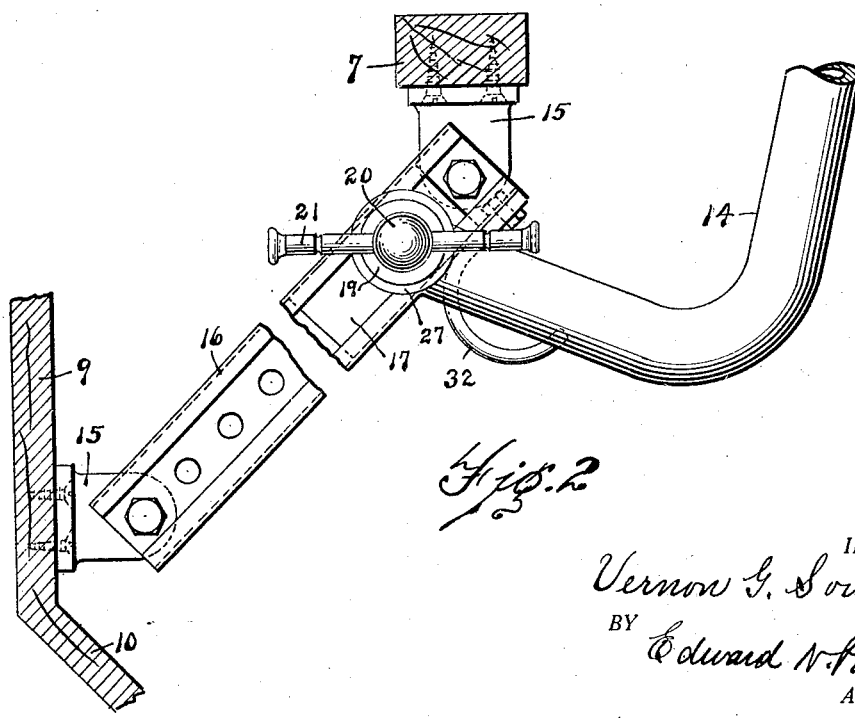

In the drawings, Fig. 1, is a side elevation of the rear end of an automobile body, a part thereof being broken away to show the present invention. Fig. 2, is a side elevation of a windshield support on a larger scale. Fig. 3, is a rear elevation thereof. Fig. 4, is a central section of a sliding block and the parts mounted thereon. Fig. 5 is an elevation of a lock washer. Fig. 6, is a perspective of the lower end of a supporting leg for the windshield. Fig. 7 is a perspective of a slidable block.

Automobiles of the runabout and coupé types are often provided with rumble seats whose backs are constituted by the doors in the back decks or rear extensions of the bodies back of the front seats, which doors, when swung down, close the openings over these seats. The present invention consists of a windshield to be moved out of the body and be secured in position in front of the occupants of the rumble seat or to be moved down into the space below the back deck so that the door may be swung down to closing position.

In Fig. 1, the body 1 is shown constructed with a curved rear deck 2 below which a rumble seat 3 is positioned. A door 4 for an opening 11 in the deck is pivoted at 5 and to it is attached a cushion 6 to serve as a comfortable seat back. A cross piece 7 constitutes the front edge of the opening in the deck. The dotted lines 8, 9 and 10 indicate the dimensions of the spaces or leg room for the passengers occupying the rumble seat and the positions of the boards which enclose it.

The windshield itself is of well known construction and comprises a frame embodying side bars 12 to which the wings 13 are pivotally secured. Legs 14 extend down from the frame and are of any desired length. Secured to the cross piece 7 on each side of the opening 11 is a small bracket 15 while similar brackets are attached to the foot board 10. Channel shaped guides 16 are secured at their ends to these brackets and a block 17 of metal is slidable in each channel. A screw 18 is threaded in each block and has a collar 19 and a knob 20 perforated to receive the rod 21 by means of which the screw may be tightened.

A cylindrical boss or hub 23 on each block 17 is designed to extend into a sleeve 24 formed on the end of a leg 14 which is therefore rotatable on this hub. The ends of the sleeves are formed with radial teeth 25 which engage similar teeth on washers 26, also rotatable on the hubs 23 and with similar teeth on washers 27 provided with lugs 28 which extend into notches 29 in the ends of the hubs so that the washers 27 cannot turn on the hubs. When the collar 19 press the washers 26 and 27 and the sleeves 24 together against the channel guides 16, they lock the windshield in any desired position. But when the screws 18 are turned back to release these parts, the washers 27 are pushed away from the sleeves 24 by the springs 30 so that the legs 14 may be swung back and after the wings 13 are folded against the main part of the windshield the blocks 17 may be slid down the channels 16 to the position shown in dotted lines in Fig. 1. When thus slid down, the hooks 32 on the rear sides of the channels 16 at their upper ends engage hinges 33 or other projections on the wings 13 and thus hold the windshield in proper position.

It will be noticed in Fig. 3 that the leg 14 is bent laterally so it may extend into a comparatively narrow seat opening. If the opening were wide, the legs 14 would be transposed so that the lateral bends would be outward. The operative teeth 25 on the sleeves would now be on the opposite ends thereof for which reason both ends of the sleeves are notched and the washers 26 are also notched. It will also be noticed that the legs 14 are provided with elbows so that while the lower ends are horizontal below the cross piece 7, the remainder may be as nearly upright as may be desired, as shown in Fig. 1.

It is evident that where space permits, the lower brackets 15 may be attached to the board 9 at greater heights, thus permitting baggage to be stored below the windshield when within the body. If desired, the windshield may be laid flat on the seat 3.

The details of construction and the proportions of the parts of this windshield support may all be changed by those skilled in the art without departing from the spirit of my invention set forth in the following claims.

I claim:—

1. In a windshield support, for vehicle compartments having that portion of the body in front of a seat overhanging the footspace for said seat, the combination of a pair of channel bars fixed in an inclined position and extending under said overhanging portion, a block slidable in each channel bar, said block being provided with a cylindrical boss, a washer non-rotatable on said boss and having radial teeth, a windshield having a pair of rigid legs formed with sleeves rotatably mounted on said bosses and having radial teeth meshing with the teeth on said washer, means to force the sleeves and washers together and springs to force the washers outward on the bosses.

2. In a windshield support, the combination of a channel bar, a block slidable in the channel of said bar and provided with a hollow boss, a rigid windshield-supporting leg formed with a sleeve rotatably mounted on said boss, and means to lock said sleeve, block and bar together, said means comprising a pair of washers mounted on said block and provided with radial teeth meshing with the teeth on the sleeve, and a member threaded into said block, and having a head adapted to force said washers and sleeve into interlocking engagement with one another and with said channel bar.

3. In a windshield support, the combination of a channel bar, a block slidable in the channel of said bar and provided with a hollow boss, a rigid windshield-supporting leg formed with a sleeve rotatably mounted on said boss, and means to lock said sleeve, block and bar together, said means comprising a pair of washers mounted on said block and provided with radial teeth meshing with the teeth on the sleeve, and a member threaded into said block, and having a head adapted to force said washers and sleeve into interlocking engagement with one another and with said channel bar, said sleeve having teeth on both sides thereof, whereby it may be reversed to reverse the position of the windshield without altering its cooperation with the remaining parts of the windshield support.

4. In a windshield support for vehicle compartments having that portion of the body in front of a seat overhanging the foot space for said seat, the combination of a pair of channel bars fixed in an inclined position and extending under said portion, a block slidable in each bar and provided with a boss, a windshield having a pair of rigid legs formed with sleeves rotatably mounted on said bosses, and means operable by a single clamping element and by a single set of movements to lock said sleeves, blocks and channel bars together.

5. In a windshield support for vehicle compartments having that portion of the body in front of a seat overhanging the foot space for said seat, the combination of a pair of channel bars fixed in an inclined position and extending under said portion, a block slidable in each channel bar, said block being provided with a cylindrical boss, a washer non-rotatable on said boss, and having radial teeth, a windshield having a pair of rigid legs formed with sleeves rotatably mounted on said bosses and having radial teeth meshing with the teeth on said washer, and means operable by a single clamping element and by a single set of movements to force the sleeves and washers together.

6. In an automobile windshield support for vehicle compartments having that portion of the body in front of a seat overhanging the foot space for said seat, the combination of a pair of guide bars fixed in an inclined position and extending under said portion, a slidable member on each guide and a supporting leg rigidly attached to a windshield and pivoted on each slidable member and means operable by a single element and by a single set of movements to lock each set of bars, slidable members and legs together, said legs having elbows adjacent their pivots to permit the legs to extend around a portion of the frame of the automobile.

VERNON G. SOUDER.